United States Patent [19]

Owen et al.

[11] Patent Number: 5,450,221
[45] Date of Patent: Sep. 12, 1995

[54] COMPACT LIQUID CRYSTAL DISPLAY FOR INSTRUMENT PANEL HAVING A WRAP AROUND FLEXIBLE PRINTED CIRCUIT BOARD AND TRANSLUCENT WEB

[75] Inventors: Marvin L. Owen, Grand Blanc; James E. Nelson, North Branch, both of Mich.

[73] Assignee: Delco Electronics Corporation, Kokomo, Ind.

[21] Appl. No.: 117,813

[22] Filed: Sep. 8, 1993

[51] Int. Cl.⁶ .................. G02F 1/1333; G02F 1/1343; H01J 5/00; G01D 11/28
[52] U.S. Cl. ...................................... 359/083; 174/50; 359/88; 361/681; 362/29; 362/222
[58] Field of Search .............. 362/29, 30, 221, 222; 359/83, 88, 48, 49, 50; 361/681; 174/50

[56] References Cited

U.S. PATENT DOCUMENTS

| | | | |
|---|---|---|---|
| 4,836,651 | 6/1989 | Anderson | 359/88 |
| 5,150,257 | 9/1992 | Mohabbatizadeh et al. | 359/39 |

FOREIGN PATENT DOCUMENTS 443527  8/1991  European Pat. Off. .............. 359/48

OTHER PUBLICATIONS

Lexin, "Meeting the Challenges of Flexible Circuits", Jul. 1992, Printed Circuit Design, pp. 22–25.

*Primary Examiner*—Anita Pellman Gross
*Assistant Examiner*—Walter J. Malinowski
*Attorney, Agent, or Firm*—Jimmy L. Funke

[57] ABSTRACT

A box-like molded housing with an open front has a flexible printed circuit wrapped around it, the printed circuit having a terminal array attached to a housing flange adjacent the front opening. A frame having a translucent web or filter covers the open front and contains a liquid crystal cell. A slot in the frame contains an elastomeric connector for joining terminals on the cell with terminals on the printed circuit to provide control signals to the cell. The housing interior is a reflector cavity and contains lamps for illuminating the web and the cell through the web. The printed circuit carries surface mount components, supplies power to the lamps, and has a contact array for connection to spring contacts of an external connector.

4 Claims, 2 Drawing Sheets

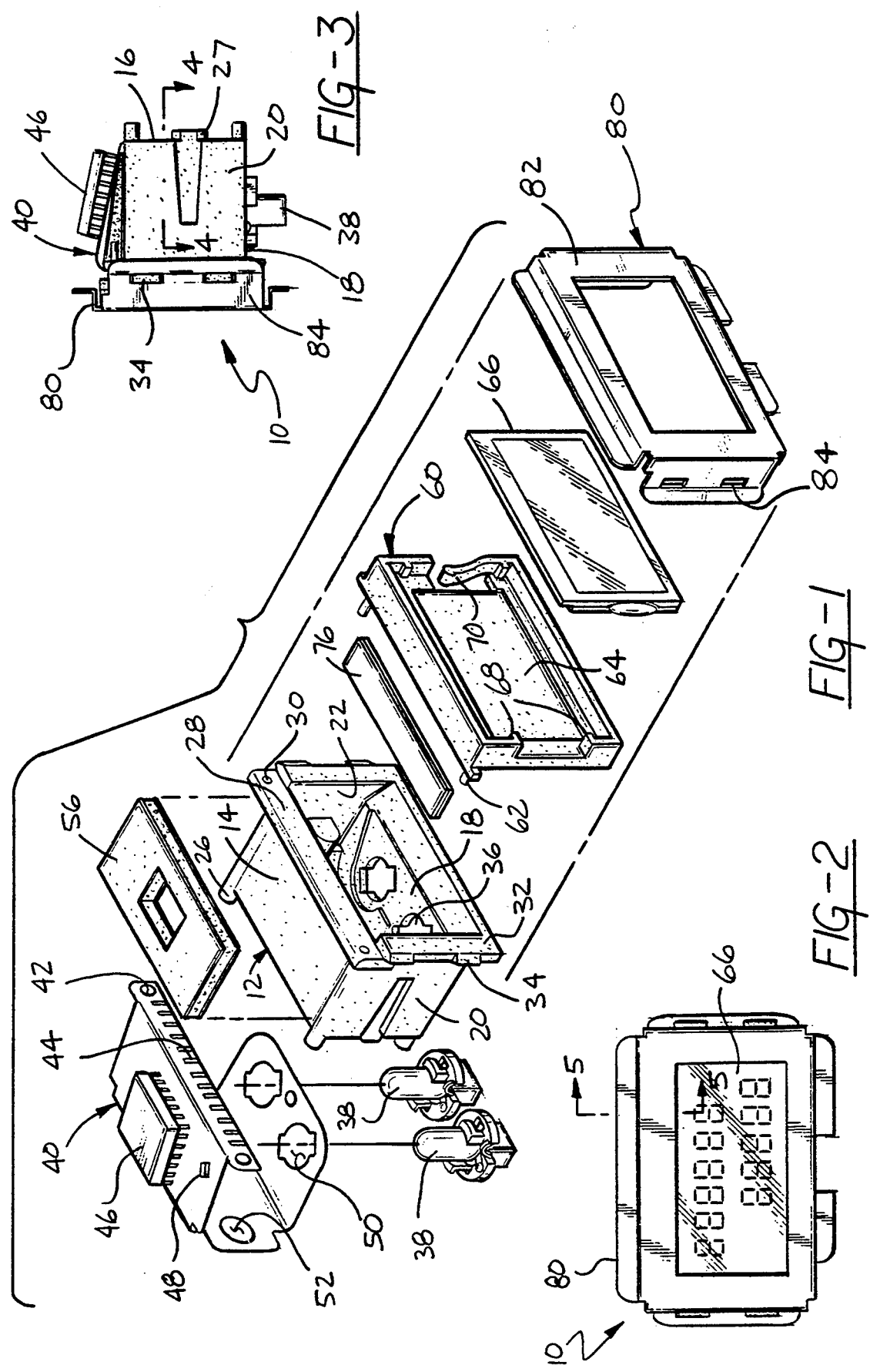

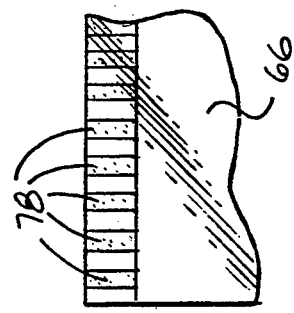
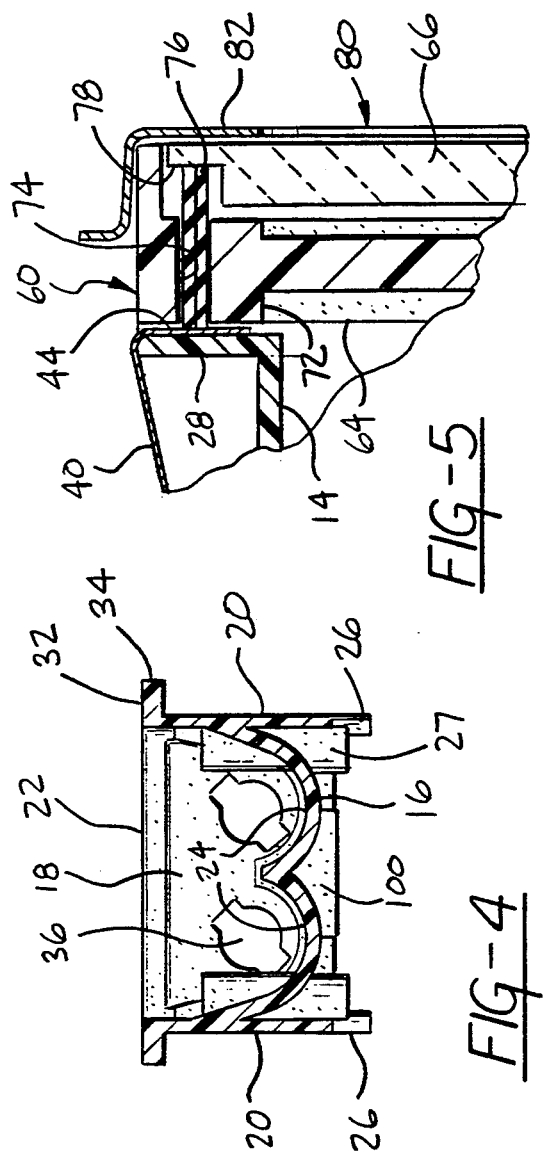
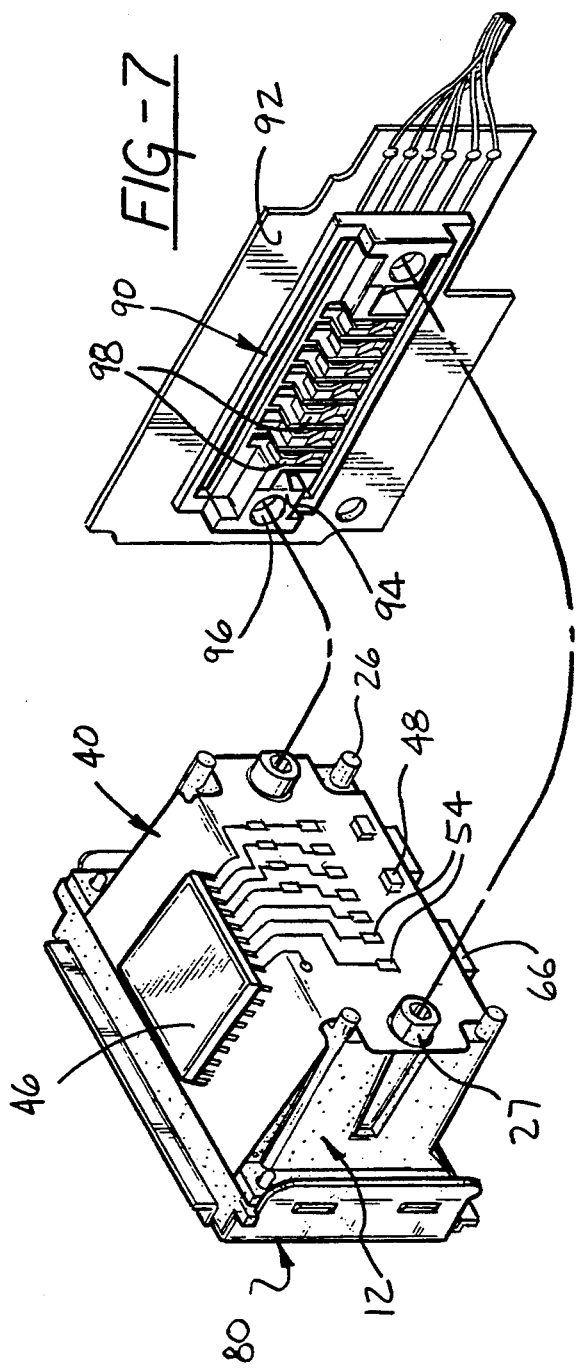

COMPACT LIQUID CRYSTAL DISPLAY FOR INSTRUMENT PANEL HAVING A WRAP AROUND FLEXIBLE PRINTED CIRCUIT BOARD AND TRANSLUCENT WEB

FIELD OF THE INVENTION

This invention relates to an automotive information display, and more particularly, to a compact package for a liquid crystal display.

BACKGROUND OF THE INVENTION

Conventional vehicle odometers comprise a mechanical device for recording vehicle mileage which is installed on the instrument panel of the vehicle. These mechanical odometers tend to be bulky mechanisms which require too much space in a very crowded environment. To accommodate mechanical odometers, clearance holes are typically provided in instrument panel printed circuits, and in some cases, formed deep pocket are required. The mechanical odometers are also difficult to package and to illuminate. Since both trip odometers and total milage odometers are used, each instrument requires either two such packages or a large single package.

It is already known to employ liquid crystal displays (LCD) for instrument panel information. These electronically driven displays have a thin liquid crystal cell and can be illuminated by various arrangements which add bulk to the display. The various arrangements have had differing levels of success due to the cost of the overall package, the quality of illumination and the ease of incorporation into the instrument panel.

SUMMARY OF THE INVENTION

It is therefore an object of the invention to provide a LCD package which optimizes display size, illumination, and cost, and is easy to assemble to an instrument panel. The LCD package is particularly useful for odometers, allowing both total milage and trip odometers to be incorporated within the same unit, and is also advantageous for other information displays.

The LCD comprises a molded housing with an open front, a flexible printed circuit wrapped around the outside of the housing, a frame, including a light filter, mounted on the front of the housing for holding a liquid crystal cell and an elastomeric conductor for coupling the cell and the printed circuit, and a front cover for holding the frame and liquid crystal cell to the housing.

The housing is a five-sided box providing support for the remainder of the components and defines an inner reflector cavity containing two lamps and having a curved back surface for uniformly illuminating the display. The lamps are mounted in apertures in the printed circuit and the bottom of the housing.

The printed circuit incorporates surface mount components, a terminal array for supplying signals to the liquid crystal cell, conductors connected to the lamps, and contacts at the rear of the housing for coupling to an external circuit.

A flange at the top of the box adjacent the open front has a pair of alignment holes, and one end of the printed circuit containing the terminal array has similar alignment holes. Locating pins on the frame engage the holes to fasten that end of the printed circuit to the housing. A slot within the top of the frame contains the elastomeric conductor which on the rear side of the frame electrically connects to the terminal array and on the front side of the frame connects to terminals on the liquid crystal cell to transmit control signals to the cell.

The frame has a cavity for holding the cell and locating details for accurately positioning the cell in the cavity, including a spring finger along one side for biasing the cell into alignment. The frame also includes a thin translucent web which diffuses light from the reflector cavity onto the liquid crystal cell. The material may be colored to impart color to the display.

Connection to external circuitry is accomplished by the printed circuit contacts at the rear of the housing. A connector with spring contacts corresponding to the printed circuit contacts is mounted on an external printed circuit board and abuts the display for engagement of the contacts. The connector and the housing are secured together by fasteners.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an exploded view of a LCD, according to the invention;

FIGS. 2 and 3, respectively, are front and side views of the assembled LCD according to the invention;

FIG. 4 is a sectional view taken along line 4—4 of FIG. 3 showing housing structure;

FIG. 5 is a sectional view taken along line 5—5 of FIG. 2 illustrating the electrical connection to the liquid crystal cell of the display;

FIG. 6 is a partial rear view of the liquid crystal cell of the display showing terminals connections; and FIG. 7 is an exploded view of an external connector and the rear of the LCD, according to the invention.

DESCRIPTION OF THE INVENTION

Referring first to FIGS. 1–4, a liquid crystal display package 10 has a molded housing 12 as its base structural member, the inside of the housing serving as a light reflecting cavity. The housing 12 is a five-sided box having a top wall 14, a rear wall 16, a bottom wall 18, two end walls 20, and a front opening 22. The rear wall 16 is curved defining two cylindrical sections serving as internal concave light reflectors 24. Spacer pins 26 extend rearwardly from each corner of the rear wall 16.

A pair of lugs 27 just inboard of the end walls extend rearwardly to facilitate connection to an external connector. An upper flange 28 extending upwardly from the top wall 14 adjacent the front opening 22 has an alignment hole 30 at each side. Side flanges 32 extend laterally from the end walls 20 adjacent the opening 22 and terminate in tabs 34. Apertures 36 in the bottom wall 18 centered relative to the light reflectors 24 permit the insertion of lamps 38 for illuminating the cavity.

A flexible printed circuit 40 is wrapped around the housing 12, covering the top flange 28, the top wall 14, the rear wall 16 and the bottom wall 18. The printed circuit has at one end a pair of alignment holes 42 corresponding to the hole 30 in the top flange 28, and a terminal array 44 between the holes 42 for carrying liquid crystal control signals. The printed circuit has conductors, not shown, comprising the display circuit along with surface mount logic module 46 which generates control signals for the display, and other surface mount components 48.

Apertures 50 in the other end on the printed circuit align with housing apertures 36 for the lamps 38, and circuit conductors supply the lamps 38. Rear apertures 52 accommodate the lugs 27. A row of contacts 54 forming a contact array on the printed circuit at the back of the housing (FIG. 7) permit connection to external circuitry which supplies power and information or data to be displayed.

The printed circuit extends from the top of the flange 28 to the rear of the top wall 14 at an angle which leaves a space between the circuit and the wall. A self-stick gasket 56 is secured to the top wall 14 just underneath the printed circuit to fill the space and provide backing for the printed circuit and the logic module 46 which is located there.

A molded filter or frame 60 has a peripheral rectangular structure for seating against the flanges 32 of the housing and against the terminal array 44 which covers the flange 28. Locator pins 62 extend rearwardly through the alignment holes 30, 42 to secure the printed circuit to the flange 28 and accurately position the terminal strip relative to the frame. The rear wall of the frame 60 comprises a translucent web 64, the whole frame being molded of a translucent polycarbonate which is colored to filter the light if a colored display is desired. Forward of the web 64, the frame defines a recess for snugly receiving a liquid crystal cell 66.

One end of the frame has locating stops 68 for precisely positioning the cell 66 laterally, and the opposite end of the frame has a spring finger 70 biased laterally inwardly for urging the cell 66 against the locating stops 68. The top member 72 of the frame, best shown in FIG. 5, has a slot 74 extending along its length contiguous with the terminal array 44. The slot 74 contains an elastomeric connector 76 which extends beyond the limits of the frame to securely contact the terminal array 44 and the corresponding terminals 78 (FIG. 6) on the cell 66. The elastomeric connector 76 has alternate conducting and insulating striations which make electrical contact between corresponding terminal elements of the array 44 and the cell 66.

An outer metal cover 80 has a margin 82 covering the boundaries of the frame 60 and the cell 66 and defining a window for viewing the cell. The cover 80 has lateral spring fingers 84 reaching to the housing to lock onto the tabs 34 on the side flanges 32, thereby holding the assembly together. The force of the cover against the cell and the frame causes the elastomeric connector 76 to be compressed to assure tight engagement with the terminals. The sides of the slot contain the elastomeric connector against collapse, assuring transmission of the force through the connector.

The display is assembled by placing the cover 80 into a holding fixture, inserting the liquid crystal cell 66 into the frame 60 and placing the frame/cell assembly into the cover. Then the elastomeric connector 76 is inserted into the slot 74. The alignment holes 42 of the printed circuit are placed over the locator pins 62 of the frame, the gasket 56 is attached to the housing, the alignment holes 30 of the top flange 28 are positioned over the locator pins 62 and the housing 12 is snapped into the cover 80. The loose end of the printed circuit is pulled around the housing, a hole in the circuit is placed over a pin on the bottom wall 18 to temporarily hold the circuit, and then the two lamps 38 are installed, thus finally securing the circuit to the housing.

While the drawing shows two rows of digits on the display to accommodate two odometer displays, it will be apparent that other arrangements are readily implemented, according to the desired display implementation. The digits will be adequately and uniformly illuminated due to the use of the filter web 64 to diffuse the light, the two lamps to directly light the web and the reflective shaped cavity to indirectly light the web.

As shown in FIG. 7, an external connector 90, installed on a flexible or a hardboard printed circuit 92, has a base 94 for contact at its corners with the spacers 26 on the back of the housing, and two holes, not shown, surrounded by counterbores 96 for registry with the lugs 27. When the connector 90 is installed on the display 10, a row of spring contacts 98 on the connector 90 engage the contacts 54 on the printed circuit 40.

A raised pad 100 molded on the back of the housing backs up the circuit in that location to resist the force of the spring contacts on the flexible printed circuit. Screws, not shown, are inserted through the holes and into the lugs 27 of the housing to secure the installation.

The LCD package is thus capable of being made very small, especially depth-wise, while assuring good illumination of the liquid crystal cell. The package is easily assembled with the parts accurately aligned for proper and secure electrical coupling. The small depth and the ease of coupling to an external connector facilitate its incorporation and assembly into an instrument panel.

The embodiments of the invention in which an exclusive property or privilege is claimed are defined as follows:

1. A liquid crystal display for mounting in an automotive vehicle comprising:
    a molded box-like housing having a front opening and a flange along at least a portion of the front opening;
    a flexible printed circuit wrapped around the box and having a terminal array positioned on the flange;
    electrical components mounted on the printed circuit for supplying control signals to the terminal array;
    a liquid crystal cell having a plurality of contact pads and mounted over the front opening;
    illumination means within the housing for backlighting the liquid crystal cell;
    a frame for supporting the cell and having means for registration with the housing and the printed circuit to align the contact pads of the cell with the terminal array;
    a translucent web within the frame between the cell and the housing and covering the front opening for passing light from the illumination means to the cell; and
    means in the frame for coupling the contact pads with the terminal array, whereby the liquid crystal cell receives the control signals.

2. The invention as defined in claim 1, wherein the means in the frame for coupling the contact pads with the terminal array includes:
    a slot in the frame contiguous with the contact pads and the terminal array; and
    an elastomeric connector in the slot in electrical contact with and interconnecting the contact pads and the terminal array.

3. The invention as defined in claim 2 further including:
    an outer clamp member secured to the housing and urging the frame and the cell toward the housing, thereby compressing the elastomeric connector between the terminal array and the cell, and clamping the terminal array portion of the printed circuit against the housing.

4. A liquid crystal display for mounting in an automotive vehicle comprising:
- a molded box-like housing having a front opening and a flange along at least a portion of the front opening;
- a flexible printed circuit wrapped around the box and having a terminal array positioned on the flange;
- electrical components mounted on the printed circuit for supplying control signals to the terminal array;
- a liquid crystal cell mounted over the front opening and coupled to the terminal array for receiving the control signals; and
- illumination means within the housing for backlighting the liquid crystal cell;
- wherein the flange has registration holes, and the display includes a frame for holding the cell adjacent the opening; the frame including:
- locating pins extending through the registration holes;
- a translucent web covering the front opening and admitting light from the illumination means to the cell;
- lateral stops at one side of the frame for positioning the cell in the frame; and
- a laterally biased spring finger at the opposite side of the frame for urging the cell against the stops.

* * * * *